UNITED STATES PATENT OFFICE.

CARLETON ELLIS, OF MONTCLAIR, NEW JERSEY.

CEREAL AND FRUIT BEVERAGE.

1,414,557.      Specification of Letters Patent.      Patented May 2, 1922.

No Drawing.      Application filed June 2, 1919. Serial No. 301,268.

*To all whom it may concern:*

Be it known that I, CARLETON ELLIS, a citizen of the United States, and a resident of Montclair, in the county of Essex and State of New Jersey, have invented certain new and useful Improvements in Cereal and Fruit Beverages, of which the following is a specification.

This invention relates to a product intended for use as a beverage and relates especially to a product containing or consisting of roasted cereals, fruits and the like and to the process of making same.

The invention is especially concerned with the production of a composition which serves as a substitute for coffee and which contains cereal mixtures or cereal and fruit mixtures roasted to different stages or degrees, and blended to produce a product having the requisite flavor and character. The production of a product suitable for a beverage serving as a substitute for coffee calls for a number of considerations. The odor of the dry product must be agreeable as well as the odor exhaled on boiling in making the beverage. The taste must be satisfactory and there should be an after taste which may be described as a sort of astringent effect or contraction at the base of the throat that makes the person taking the beverage want more, this after taste exists in coffee and is one reason, at least, for its popularity, and the quantity consumed by a person at one time. Beverages which have a good flavor but do not possess the requisite after taste do not have the retentive effect produced on drinking coffee. In the present invention it is an object to prepare a cereal beverage which possesses these qualities. This result may be attained by means of a suitably roasted mixture of cereals and fruits and especially by a mixture containing the cereals and fruits separately roasted in part at least. In order to secure the proper flavor from certain cereal products it is desirable that these be roasted or browned to a very considerable extent. When roasting fruits of the character specified, however, at such temperatures as are employed in roasting the cereals alone, deleterious changes would take place, which would produce undesired flavors in the final product. Preferably according to the present invention a portion at least of the cereal basis is heavily roasted and a portion at least of the fruit material is lightly roasted; and the product of light roasting is mixed, in suitable proportions, with the product of heavy roasting. As a cereal basis I may use wheat, rye, oats, barley, corn meal, bran, whole wheat and the like as also vegetable flour such as ground peas, beans, etc. As a fruit basis I preferably use raisins which may be seeded or not, but preferably are ground to a pulp in order to be well incorporated. In some cases the seeds themselves from raisin seeding plants may be employed. These have a considerable amount of pulp attached and may be ground and incorporated in the composition; other fruits such as figs, dates, prunes and the like may be used. Also flavoring products such as dandelion root, gold thread, etc., may be used in some cases. Also peanuts, cocoanuts, cocoanut meat and similar products may be used to a greater or lesser extent. As an example the following may be given: 1 pound of seeded raisins is passed through a comminuting device to produce a pulpy mass and this is boiled with a little water to make a syrupy product. A half pound of molasses is added thereto. 2 pounds of barley are roasted to a light brown and ground to a powder. This material is mixed with 2 pounds each of corn meal and bran. To this is added the mixture of raisins and molasses and the mix stirred thoroughly until well incorporated and is then dried. It is roasted to a light brown and allowed to cool. If desired during the last stages of the roasting a small amount of water may be added to increase the weight and temper the mass. A half pound of barley, roasted as above, and 1½ pounds of bran are mixed and moistened with a small amount of diluted molasses or other binding agent and roasted to a deep brown, care being taken not to scorch the product although advancing the roast as far as possible without burning. This material is cooled and mixed with the product obtained by light roasting. It is not necessary to follow these proportions as other mixtures may be produced in which either the light roast or the dark roast predominates but the best results are obtained usually with a predominance of the light roast and preferably in the proportion of two to one. The addition of a binding agent to the dark roast is desirable in order to secure a product of coarser grain. It also tends to make a more compact product.

Bran is a very bulky article and the more it can be contracted the more concentrated will be the product. One-half of the bran may be replaced, if desired, by ground peas or beans.

In preparing a beverage from this dry material approximately a heaping teaspoonful of the product is employed to a cup of water, this may be boiled for ten or fifteen minutes when a beverage is obtained which has excellent color and possesses the desired flavor and after taste. By making an aqueous extract from the dry stock and evaporating the extract to dryness in a vacuum pan and grinding to a powder a product is obtained which yields the beverage merely on the addition of boiling water.

What I claim is:—

1. A cereal beverage basis which comprises dried fruit of the general character of raisins, figs, dates and prunes, roasted sufficiently to substantially dehydrate the same but not to caramelize any substantial part of the sugar content, together with cereal material roasted sufficiently to substantially darken the same at a temperature almost sufficient to burn the material.

2. A process of preparing a cereal coffee substitute which comprises roasting cereal material at a temperature only slightly below that necessary to burn the same, such roasting being sufficient to substantially darken the said material; roasting fruit material of the general character of raisins, figs, dates and prunes at a temperature lower than that employed in the first-mentioned step, such temperature being insufficient to substantially caramelize the sugar content of such fruit; and mixing said roasted products together.

3. A process of preparing a cereal coffee substitute which comprises roasting cereal material at a temperature only slightly below that necessary to burn the same, such roasting being sufficient to substantially darken the said material; roasting fruit material of the general character of raisins, figs, dates and prunes together with additional cereal material, at a temperature lower than that employed in the first-mentioned step, such temperature being insufficient to substantially caramelize the sugar content of such fruit; and mixing the said roasted products together.

CARLETON ELLIS.